(12) United States Patent
Crocker et al.

(10) Patent No.: US 6,186,871 B1
(45) Date of Patent: Feb. 13, 2001

(54) APPARATUS FOR PERFORMING A POLISHING OPERATION ON A FIBRE OR A FIBRE OPTIC CABLE IN A CABLE TERMINATION

(75) Inventors: Jason Paul Crocker, Somerset; Nigel Saunders, Kington Langley, both of (GB)

(73) Assignee: GKN Westland Helicopters Limited, Yeovil (GB)

( * ) Notice: Under 35 U.S.C. 154(b), the term of this patent shall be extended for 0 days.

(21) Appl. No.: 09/501,260

(22) Filed: Feb. 9, 2000

(30) Foreign Application Priority Data

Feb. 9, 1999 (GB) .................................................... 990273

(51) Int. Cl.[7] ...................................................... B24B 1/00
(52) U.S. Cl. .............................. 451/41; 451/278; 451/359
(58) Field of Search .............................. 451/41, 278, 359, 451/28, 63, 279, 344, 357

(56) References Cited

U.S. PATENT DOCUMENTS

| 3,975,865 | * | 8/1976 | Lewis | .................................... 451/359 |
| 4,831,784 | | 5/1989 | Takahashi . | |
| 5,038,524 | | 8/1991 | Moulin . | |
| 5,674,114 | * | 10/1997 | Miller et al. | .......................... 451/278 |
| 5,720,653 | * | 2/1998 | Miller et al. | .......................... 451/278 |
| 6,039,630 | * | 3/2000 | Chandler et al. | ..................... 451/278 |

FOREIGN PATENT DOCUMENTS

| 2 057 932 | | 4/1981 | (GB) . | |
| 2058617 | * | 4/1981 | (GB) | .................................... 451/278 |

* cited by examiner

*Primary Examiner*—Derris H. Banks
(74) *Attorney, Agent, or Firm*—Larson & Taylor, PLC

(57) ABSTRACT

An apparatus for performing a polishing operation on a fiber of a fiber optic cable in a cable termination, including means to receive the termination with the fiber extending therefrom towards a polishing surface, an operating means to bring the extending fiber and the polishing surface together, means to move the polishing surface relative to the termination and the fiber with the fiber and polishing surface in contact, to perform polishing of the fiber, characterized in that the operating means includes a manually operable member which is pivotal about a pivot axis, and means to bring the extending fiber and polishing surface together in response to pivoting movement of the manually operable member in a direction transverse to the pivot axis.

15 Claims, 2 Drawing Sheets

APPARATUS FOR PERFORMING A POLISHING OPERATION ON A FIBRE OR A FIBRE OPTIC CABLE IN A CABLE TERMINATION

BACKGROUND OF THE INVENTION

This invention relates to an apparatus for performing a polishing operation on a fiber of a fiber optic cable in a cable termination.

DESCRIPTION OF THE PRIOR ART

Fiber optic cables transmit data as pulses of light along a fiber comprising a core contained in a cladding having a different refractive index. Typically the fiber may have a diameter of only 50–300 microns. To allow the light pulses to pass from the core of the fiber at a termination of the cable into another core where two cables are joined, or to data handling apparatus where the cable terminates, the fibre must be accurately aligned and optically prepared.

To achieve this, the fibre optic cable is terminated in a termination which holds the cable and provides for connection to another termination or other connector. The fibre of the cable is set relative to the termination with an adhesive, and an end of the fibre which projects from a surface of the termination is polished to an optical flat.

The polishing process is critical to achieving a required quality of transmission of the light pulses, as pool polishing can introduce cracks and deep scratches into the fibre which cannot be removed. Such cracks and deep scratches can seriously affect the quality of the light transmission, resulting in loss of bandwidth or even corrupted data.

Whereas the fibre could be polished manually, various apparatus are known for more automated polishing. In each case a polishing surface or film is used, and relative movement is performed between the polishing surfacing and the fibre optic core.

Polishing apparatus for use in a laboratory environment are known which comprise a glass plate on which polishing film is mounted, and a fixture to hold the termination with the fibre projecting from a surface thereof. However known such apparatus require a high degree of skill to achieve satisfactory results consistently. Furthermore such apparatus are not portable.

It is desirable to be able to perform a polishing operation on a fibre of a fibre optic cable in a cable termination in situ, for example on board an aircraft where fibre optic cables are used for data transmission. In such environments there may be no readily available power supply for operating a polishing apparatus, and polishing may need to be carried out in very confined spaces, where no work surface is available. Also the persons expected to carry out such polishing may not be skilled in that task. Because in situ there may be little spare length of fibre optic cable, re-working of cable terminations may not be possible. The problems of in situ fibre optic repair and the like are aggravated because of the variety of different termination types in use, some having spring loaded parts which means that the terminations require particular handling.

Hand held fibre optic polishing apparatus have been proposed, but by the nature of their construction, they have not performed adequately and have been unable to handle a variety of termination types.

SUMMARY OF THE INVENTION

According to a first aspect of the invention we provide an apparatus for performing a polishing operation on a fibre of a fibre optic cable in a cable termination, the apparatus including means to receive the termination with the fibre extending therefrom towards a polishing surface, an operating means to bring the extending fibre and the polishing surface together, means to move the polishing surface relative to the termination and the fibre with the fibre and polishing surface in contact, to perform polishing of the fibre, characterised in that the operating means includes a manually operable member which is pivotal about a pivot axis, and means to bring the extending fibre and polishing surface together in response to pivoting movement of the manually operable member in a direction transverse to the pivot axis.

Thus by virtue of the simple construction of the apparatus, a simply operated and versatile apparatus may be provided, particularly suited for hand held use in situ by unskilled persons.

The apparatus may comprise a body and the manually operable member may be mounted on the body, whilst the means to receive the termination may be provided by a support assembly which is moveable relative to the body in response to pivoting movement of the manually operable member. To facilitate its use in confined conditions by unskilled persons, the apparatus may have guide means to guide the movement of the support assembly relative to the body in a direction normal to the pivot axis of the manually operable member, so that the projecting fibre and polishing surface are reliably brought together in a desired relative orientation in response to a simple manual movement of the manually operable member.

In one construction the manually operable member may be pivoted at one end to the body and may act to move the support assembly through a lever which is also pivotally mounted on the body and preferably also to the support assembly.

To prevent too much pressure being applied between the polishing surface and the projecting fibre by operation of the manually operable member, preferably the support assembly comprises a first part on which the manually operable member acts, and a second part which provides the means to receive the termination, the first part being moveable relative to the second part when the support assembly has been moved relative to the body so as to bring the termination and projecting fibre optic core into contact with the polishing surface at a predetermined pressure.

Desirably guide means are provided between the first and second parts of the support assembly to allow relative movement therebetween, and resilient means act between the first and second parts of the support assembly to resist relative movement therebetween until the predetermined pressure is applied by the manually operable member. Thus the first and second parts will move in concert in response to movement of the manually operable member to bring the polishing surface and projecting fibre together, but in the event that excess pressure is applied, the resilient means will permit of continued movement of the first part, movement of the second part is relieved.

The means which receive the termination may comprises an opening in the support assembly, preferably in the second part of the assembly, the opening being adapted so that the fibre extends from the termination in a direction substantially normal to the direction of movement of the support assembly relative to the body. To enable the apparatus to be used with a variety of termination types the opening may be provided in a removable insert which is adapted to receive a termination of a particular configuration and thus which may readily be exchanged for a removable insert which is adapted to receive a termination of another particular configuration.

In addition to any resilient means which act between the first and second parts of the support assembly, resilient means may act between the body and the support assembly to resist movement of the termination and projecting fibre towards the polishing surface in response to operation of the manually operable member, thus to improve control of the polishing process and to move the support assembly away from the polishing surface when the manually operable member is released.

An apparatus according to the invention may include a motor to move the polishing surface relative to the termination, and a housing for a power supply for the motor so that no external drive means or power supply is required.

For most efficient use of the polishing surface the polishing surface may be moved relative to the termination by a transmission which provides for relatively eccentric motion of the polishing surface relative to the termination.

According to a second aspect of the invention we provide a method of performing a polishing operation on a fibre of a fibre optic cable in a termination of the cable utilising a portable hand held apparatus including means to receive the termination with the fibre extending therefrom towards a polishing surface, an operating means to bring the extending fibre and the polishing surface together, means to move the polishing surface relative to the termination and the fibre with the fibre and polishing surface in contact, to perform polishing of the fibre, the method comprising manually operating a manually operable member by pivoting the member about a pivot axis to bring the extending fibre and polishing surface together.

BRIEF DESCRIPTION OF THE DRAWINGS

The invention will now be described with reference to the accompanying drawings in which.

DESCRIPTION OF THE PREFERRED EMBODIMENTS

Figure 1:
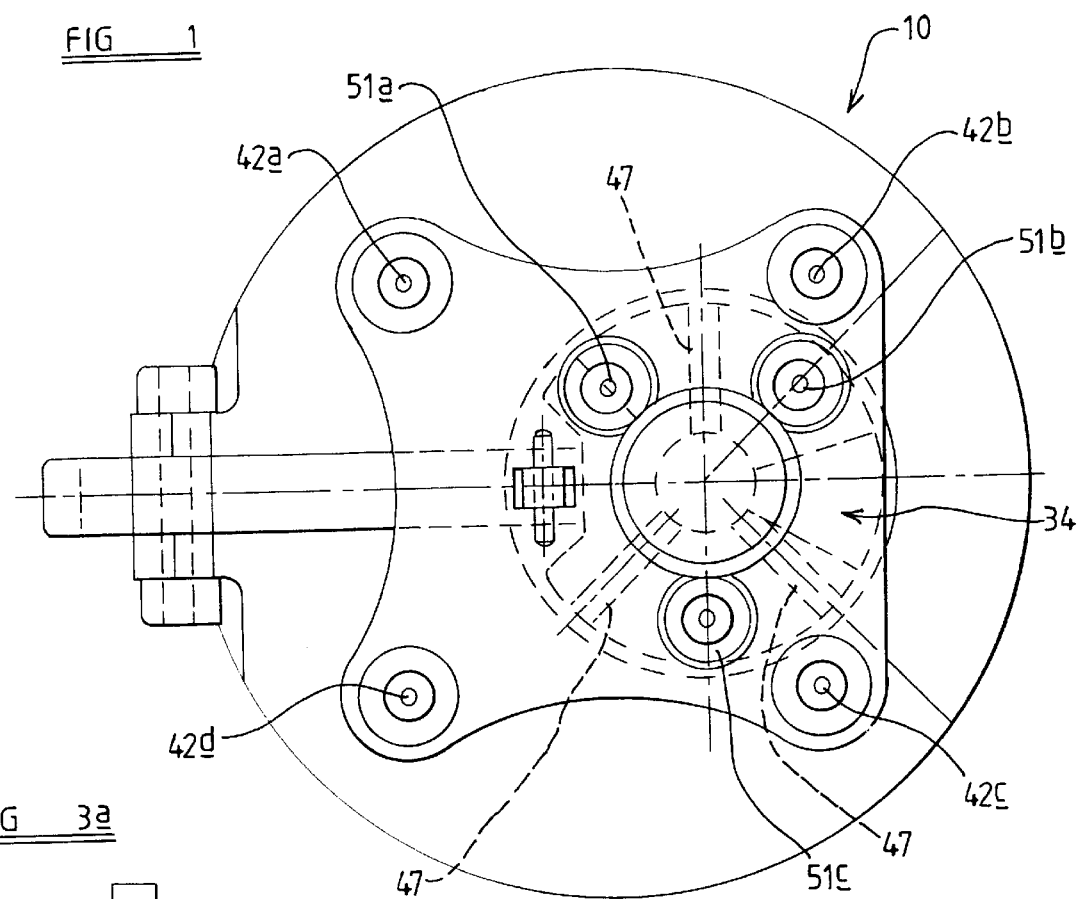
FIG. 1 is a plan view of a polishing apparatus in accordance with the invention.

Referring to the drawings, an apparatus 10 for performing a polishing operation on a fibre 11 of a fibre optic cable 12 in a cable termination 14 is illustrated.

A typical fibre optic cable termination procedure is as follows.

Figure 3A:
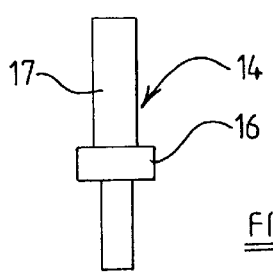
FIGS. 3a to 3d is a schematic illustration of a fibre optic cable termination procedure which includes a polishing process for which the apparatus of FIG. 1 may be used.

First, the fibre optic cable 12 is prepared by stripping back outer layers 15 thereof to leave a projecting length of fibre 11 comprising a core surrounded by cladding (not shown). The projecting fibre 11 is then inserted into a termination 14 which in the example shown in FIG. 3a is a metal ferrule 16 having a ceramic part 17 with a central opening to receive the fibre 11. The ferrule 16 has a female screw thread (not seen) by which the termination 14 is connectable to a corresponding male threaded termination of another fibre optic cable, or a male threaded part of a data handling machine or the like.

Figures 3B, 3C, 3D:
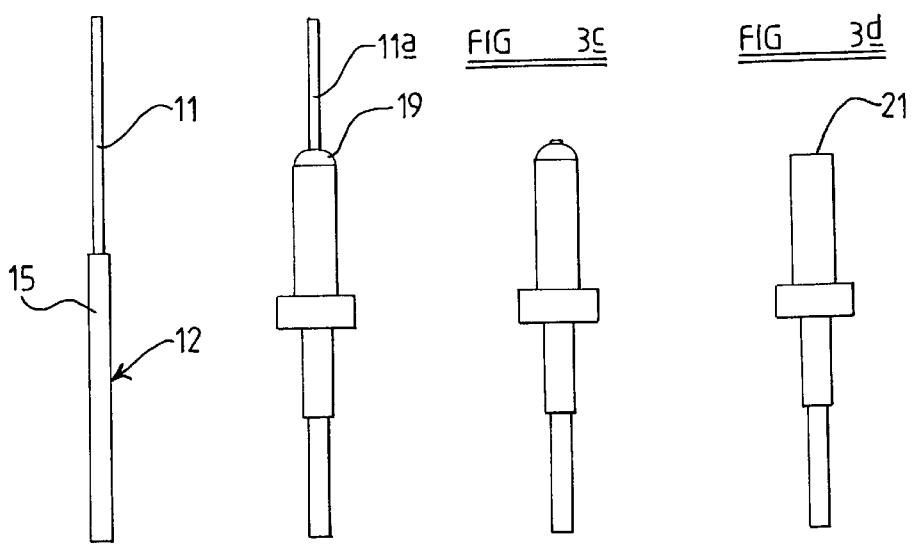

The projecting length of the fibre 11 is such that when inserted, with the outer layers 15 received by the ferrule 16, a portion 11a of the fibre 11 projects outwardly of the ceramic part 17 as seen in FIG. 3b.

The fibre 11 is set in the ceramic salt 17 by means of an adhesive, usually an epoxy adhesive, which may be introduced into the ferrule 16 ahead of the fibre 11, so that as the fibre 11 is introduced, some of the adhesive is ejected from the opening in the ceramic 17, as indicated at 19 in FIG. 3b, to form a dome of adhesive about the projecting fibre portion 11a.

Next the cable 12 is secured relative to the termination 14 by curing the epoxy 19 e.g. by applying heat, or is simply allowed to cure. The projecting portion 11a is then shortened by a cleaving process, to leave a short projecting length only, as seen in FIG. 3c, projecting from an end surface of the ceramic part 17 of the termination. The fibre 11 can then be polished to an optical flat 21 as indicated in FIG. 3d, which polishing will also remove the dome of epoxy 19.

Figure 2:
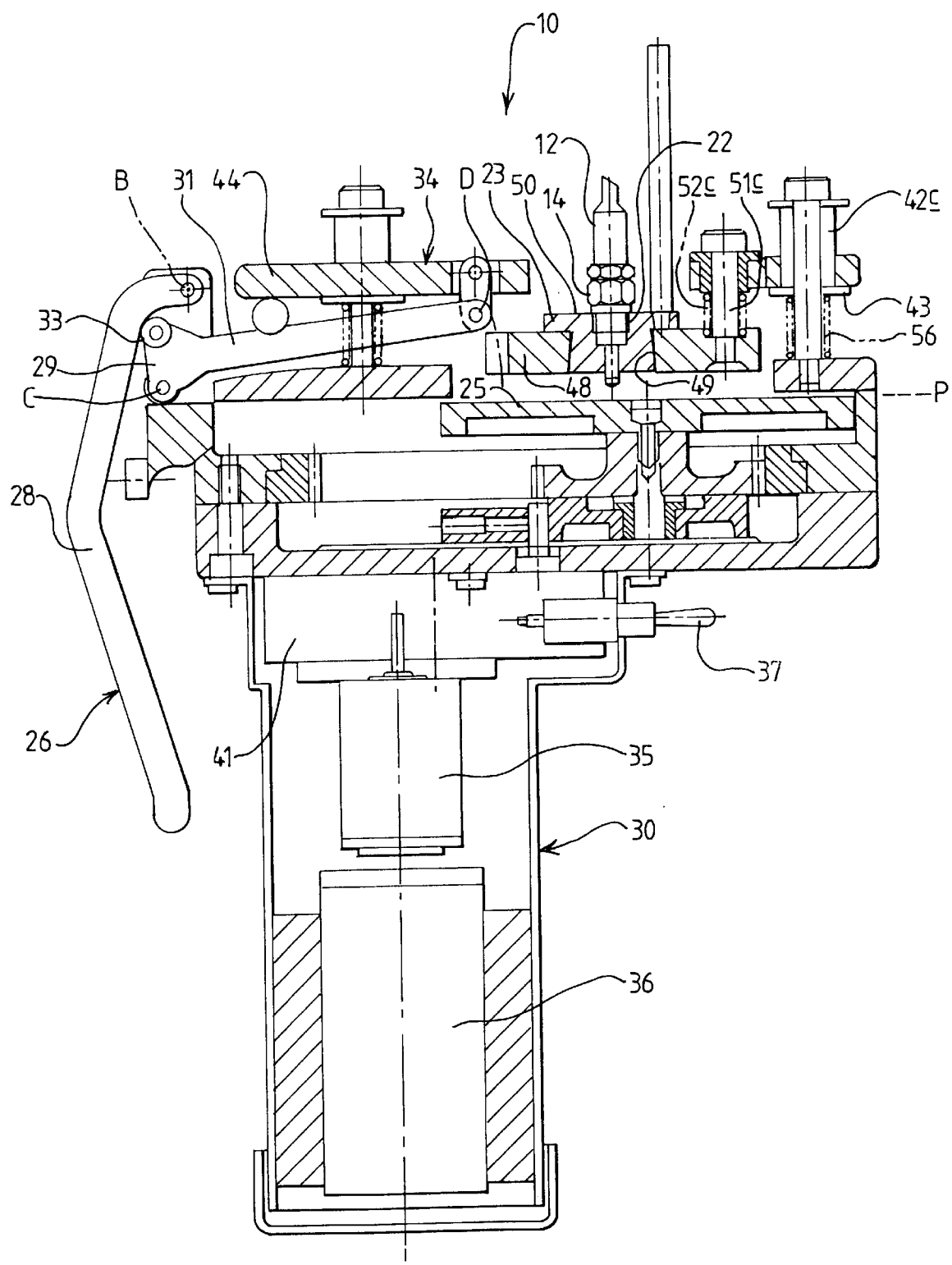
FIG. 2 is a side sectional view along the line A—A of the apparatus of FIG. 1.

Referring particularly to FIGS. 1 and 2, a polishing apparatus 10 includes an opening 22 in a removable insert 23 to receive the termination 14 with the fibre 11 extending from the end surface 21 of the termination 14 towards a polishing surface 25 which in this example is a very fine grade polishing film.

An operating means 26 is provided to bring the extending fibre 11 and the polishing surface 25 together. The operating means 26 comprises a manually operable handle member 28 which is pivotal about a pivot axis B. This may be achieved by an operator holding a body 30 of the apparatus 10 with his fingers about the handle 28. As the handle 28 pivots about axis B, the handle 28 acts on a lever 31 which is also pivoted at one end 29 thereof to the body 30, but for movement about an axis C, the axes B and C being parallel to but spaced from one another, the handle 28 bearing on a roller 33 between the handle 28 and lever 31. As the handle 28 is pivoted about axis B, the lever 31 is caused to pivot about axis C.

An opposite end 32 of the lever 31 is pivoted to a support assembly 34, to pivot about a pivot axis D. As a result of handle 28 movement, the support assembly 34 moves relative to the body 30 as hereinafter described.

Within the body 30 there is provided a motor 35, and a power pack (battery) 36. The motor 35 is operated by a switch 37 but could be operated via a microswitch for example, upon handle 28 movement.

The motor 35 drives the polishing surface 25 through a transmission 41 so that the polishing surface 25 undergoes an eccentric movement in a plane P beneath the termination 14.

The support assembly 34 is mounted on the body 30 by a first guide means provided by four pillars 42a to 42d. Each pillar 42a to 42d has an end stop 43, and the support assembly 34 can move up and down guided along the pillars 42a to 42d (only up as far as the stops 43 allow) with the pillars 42a to 42d each received in a corresponding opening of a first part 44 of the support assembly 34, the first part 44 comprising a plate-like part.

Within an opening 46 of the first plate-like part 44 of the support assembly 34, there is mounted a second plate-like part 48 which provides an opening 49 for the insert 23 which provides the opening 22 to receive the termination 14. The opening 49 for the insert 23 has, in this example, three inwardly extending sprung plungers 47, which are receivable in e.g. a groove provided in the insert 23, for the purposes of retaining the insert 23 in the opening 49. The insert 23 is of top-hat shape, a brim 50 of the hat sitting on the second plate-like part 48 to prevent the insert 23 passing downwardly as seen in FIG. 2 of the drawings, through the second plate-like part 48.

The second plate-like part 48 is mounted with respect to the first plate-like part 45 on three pillars 51a to 51c, each pillar 51a to 51c providing a second guide means in the event of there being relative movement between the first plate-like part 44 and the second plate-like part 48. However such relative movement is resisted by resilient biasing means comprising springs 52a to 52c, one being provided on each of the pillars 51a to 51c.

By virtue of the first guide means 42a–42d guiding the first plate-like part 44 movement, when the handle 28 is operated by pivoting towards the body 30, the movement of the lever 31 will cause the first plate-like part 44 and hence the second plate-like part 48 and thus the termination 14, to move towards the polishing surface 25, to bring the projecting fibre portion 11a into contact with the polishing surface 25. The pillars 42a to 42d of the first guide means may carry resilient biasing means 56 comprising springs which act between the body 30 and the first plate-like part 44, to resist handle 28 movement and thus improve the control of the polishing process. However the force of those springs 56 may be readily overcome by the normal operation of the handle 28.

Thus with the motor 35 switched on and the polishing surface 25 performing its eccentric movement, the projecting fibre 11 may be moved towards the moving polishing surface 25 to polish away the dome of epoxy 19 and the projecting length of the fibre 11.

If too great a pressure is applied to the handle 28 by the operator, excess pressure greater than the force applied between the first and second plate-like parts 44,48 by the springs 52a to 52c of the second guide means 51a–51c, will be relieved by the springs 51a to 51c, so that the first plate-like part 44 may continue to be moved by the handle operation, but the second plate-like part 48 will not continue to move towards the polishing surface 25.

Handle 28 movement is eventually arrested by a stop 59 of the body 30.

It will be appreciated that the insert 23 providing the receiving opening 22 for the termination 14 may be removed from the opening 49 in the second plate-like part 48, and may be replaced with a different insert having an opening adapted to receive a different kind or configuration of termination.

Various modifications may be made without departing from the scope of the invention.

For example although eccentric polishing surface 25 movement is preferred, in another arrangement an orbital or even circular movement may be performed by the transmission 41. The first and second plate-like members 44,48 may be of other configurations than shown, as may be the first and/or guide means 42a–42d and 51a–51c which mount them.

Instead of a lever 31 arrangement as shown, an alternative mechanism for transmitting the pivotal movement of the handle 28 to a linear movement of the support assembly 34 to bring the projecting fibre portion 11a and the polishing surface 25 together, may alternatively be provided.

The battery pack 36 may be rechargeable, or if desired the apparatus 10 may be powered by external means where an external power supply is conveniently available.

What is claimed is:

1. An apparatus for performing a polishing operation on a fibre of a fibre optic cable in a cable termination, the apparatus including means to receive the termination with the fibre extending therefrom towards a polishing surface, an operating means to bring the extending fibre and the polishing surface together, means to move the polishing surface relative to the termination and the fibre with the fibre and polishing surface in contact, to perform polishing of the fibre, wherein the operating means includes a manually operable member which is pivotal about a pivot axis, and means to bring the extending fibre and polishing surface together in response to pivoting movement of the manually operable member in a direction transverse to the pivot axis.

2. An apparatus according to claim 1 wherein the apparatus comprises a body and the manually operable member is mounted on the body, the means to receive the termination being provided by a support assembly which is moveable relative to the body in response to pivoting movement of the manually operable member.

3. An apparatus according to claim 2 wherein guide means are provided to guide the movement of the support assembly relative to the body in a direction normal to the pivot axis of the manually operable member.

4. An apparatus according to claim 2 wherein the manually operable member is pivoted at one end to the body and acts to move the support assembly through a lever which is also pivotally mounted on the body.

5. An apparatus according to claim 4 wherein the lever is pivotally connected to the support assembly.

6. An apparatus according to claim 2 wherein the support assembly comprises a first part on which the manually operable member acts, and a second part which provides the means to receive the termination, the first part being moveable relative to the second part when the support assembly has been moved relative to the body so as to bring the termination and projecting fibre into contact with the polishing surface at a predetermined pressure.

7. An apparatus according to claim 6 wherein guide means are provided between the first and second parts of the support assembly to allow relative movement therebetween.

8. An apparatus according to claim 6 wherein resilient means act between the first and second parts of the support assembly to resist relative movement therebetween until the predetermined pressure is applied by the manually operable member.

9. An apparatus according to claim 6 wherein the means which receive the termination comprises an opening in the support assembly, adapted so that the fibre extends from the termination in a direction substantially normal to the direction of movement of the support assembly relative to the body.

10. An assembly according to claim 9 wherein the opening is provided in the second part of the assembly.

11. An apparatus according to claim 10 wherein the opening is provided in a removable insert of the support assembly which is adapted to receive a termination of a particular configuration.

12. An apparatus according claim 2 wherein resilient means act between the body and the support assembly to resist movement of the termination and projecting fibre towards the polishing surface in response to operation of the manually operable member.

13. An apparatus according to claim 1 wherein the apparatus includes a motor to move the polishing surface relative to the termination, and a housing for a power supply for the motor.

14. An apparatus according to claim 1 wherein the polishing surface is moved relative to the termination by a transmission which provides for relatively eccentric motion of the polishing surface relative to the termination.

15. A method of performing a polishing operation on a fibre of a fibre optic cable in a termination of the cable utilising a portable hand held apparatus including means to receive the termination with the fibre extending therefrom towards a polishing surface, an operating means to bring the extending fibre and the polishing surface together, means to move the polishing surface relative to the termination and the fibre with the fibre and polishing surface in contact, to perform polishing of the fibre, wherein the method comprises manually operating a manually operable member by pivoting the member about a pivot axis to bring the extending fibre and polishing surface together.

* * * * *

UNITED STATES PATENT AND TRADEMARK OFFICE
CERTIFICATE OF CORRECTION

PATENT NO. : 6,186,871 B1
DATED : February 13, 2001
INVENTOR(S) : Crocker et al.

It is certified that error appears in the above-identified patent and that said Letters Patent is hereby corrected as shown below:

<u>Title page,</u>
Item (30), Foreign Application Priority Data
Feb. 9, 1999 (GB).................................................................................9902732

Signed and Sealed this

Twenty-fifth Day of September, 2001

Attest:

*Nicholas P. Godici*

NICHOLAS P. GODICI
*Acting Director of the United States Patent and Trademark Office*

*Attesting Officer*